United States Patent [19]

Watanuki et al.

[11] Patent Number: 4,716,748
[45] Date of Patent: Jan. 5, 1988

[54] STEERING LOCK DEVICE

[75] Inventors: Yoshio Watanuki, Ebina; Haruo Mochida, Kanagawa; Hidekazu Satou, Kasukabe, all of Japan

[73] Assignees: Nissan Motor Co., Ltd.; Kokusan Kinzoku Kogyo Kabushiki Kaisha, both of Japan

[21] Appl. No.: 877,508

[22] Filed: Jun. 23, 1986

[30] Foreign Application Priority Data

Jun. 24, 1985 [JP] Japan .................. 60-135898

[51] Int. Cl.⁴ ................ B60R 25/02; E05B 65/12
[52] U.S. Cl. .................... 70/252; 70/279; 70/283; 307/10 AT
[58] Field of Search ........... 70/252, 277, 279, 283, 70/237, 182–186; 180/287; 280/779; 200/61.54; 307/10 AT, 10 R

[56] References Cited

U.S. PATENT DOCUMENTS

| | | | |
|---|---|---|---|
| 3,708,032 | 2/1973 | Suzuki | 130/114 |
| 4,425,770 | 1/1984 | Mentani et al. | 70/252 |
| 4,426,864 | 2/1984 | Morikawa | 130/114 |
| 4,427,967 | 1/1984 | Maiocco | 70/252 X |

FOREIGN PATENT DOCUMENTS 57-68053 4/1982 Japan .
0191654 11/1983 Japan .................. 70/252

Primary Examiner—Lloyd A. Gall
Attorney, Agent, or Firm—Leydig, Voit & Mayer

[57] ABSTRACT

In a steering lock device of a type which can unlock a steering shaft of a vehicle without using a key, there is provided a so-called "back-up" means for assuring the steering shaft unlocking condition of the device when the key in a key rotor assumes "ignition ON" position. The means comprises a pivotally supported check lever having a first end projectable into the key rotor and a second end lockably engageable with a steering shaft locking bar. When the keyless unlocking is intended, the first end of the check lever is moved away from the key rotor by an electromagnetically actuated plunger thereby permitting rotation of the rotor toward the ON position disengaging the locking bar from the steering shaft. Upon completion of disengagement of the locking bar from the steering shaft, the second end of the check lever is brought into locking engagement with the locking bar thereby holding the same in the steering shaft unlocking condition.

9 Claims, 6 Drawing Figures

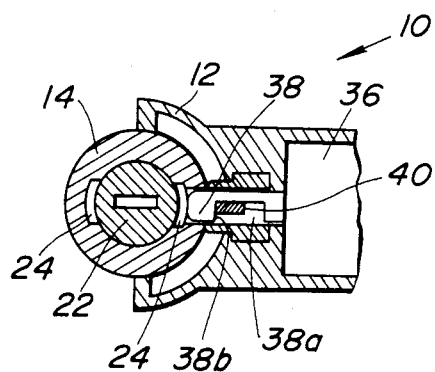
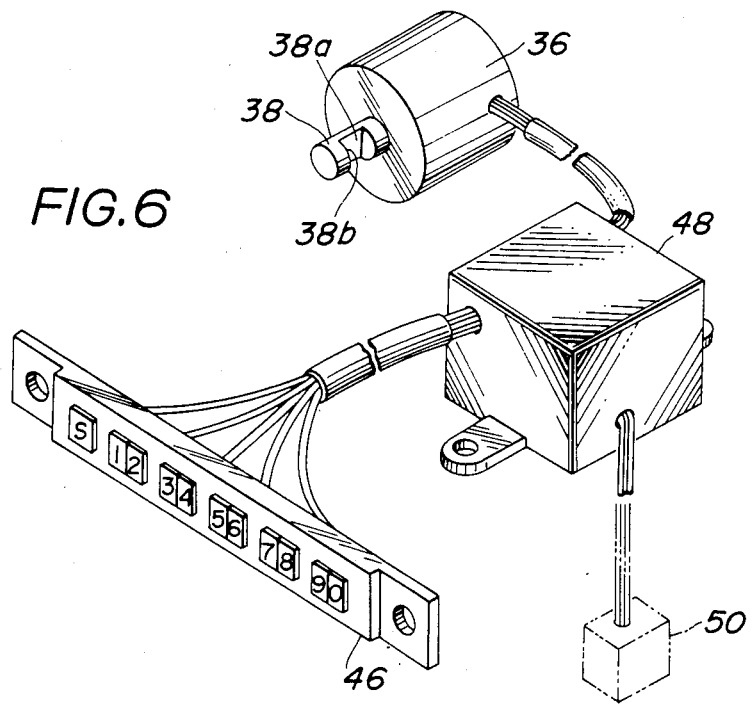

STEERING LOCK DEVICE

BACKGROUND OF THE INVENTION

1. Field of the Invention

The present invention relates in general to steering lock devices for use in a wheeled motor vehicle, and more particularly to steering lock devices of a type which can unlock a steering shaft without using a key as well as by using the key.

2. Description of the Prior Art

Hitherto, there have been proposed various steering lock devices of the above-mentioned type. One of the conventional steering lock devices is shown in Japanese Utility Model First Provisional Publication No. 57-68053. However, in some of the conventional steering lock devices including the device disclosed in the publication, there is not provided so-called "back-up" means which assures the steering shaft unlocking condition of the device when the key in a key cylinder assumes "ignition-ON" position. As is known, the back-up means is very important in order to prevent an unexpected dangerous sudden locking of the steering shaft during moving of the vehicle.

SUMMARY OF THE INVENTION

It is therefore an essential object of the present invention to provide an improved steering lock device of the above-mentioned type, which is equipped with a so-called "back-up" means for assuring the steering shaft unlocking condition of the device.

According to the present invention, there is provided an improved steering lock device having a locking bar which is lockably engageable with a steering shaft. The device comprises a hollow body, a cylindrical case rotatably received in the hollow body and having a locking hole, a knob connected to the cylindrical case to rotate therewith, a rotor rotatably received in the cylindrical case and having a plurality of tumblers which are projectable therefrom into grooves formed in the cylindrical case, a check lever pivotally mounted in the hollow body, the check lever having one end projectable into the rotor and the other end engageable with a given portion of the locking bar to hold the same in a steering shaft unlocking condition, biasing means for biasing the check lever in a direction to project the one end of the check lever into the rotor, an actuator having a locking plunger which is projectable into the locking hole of the cylindrical case to lock the same relative to the hollow body, and coupling means for coupling the check lever and the locking plunger in a manner to move the one end of the check lever away from the rotor when the locking plunger is moved away from the locking hole of the cylindrical case.

BRIEF DESCRIPTION OF THE DRAWINGS

FIG. 3 is a sectional view taken along the line III—III of FIG. 1;

FIG. 6 is a perspective view showing a keyboard, a control unit, an actuator for the steering lock device and a vehicle condition sensor which are operatively connected through wires.

DETAILED DESCRIPTION OF THE INVENTION

Figure 1:
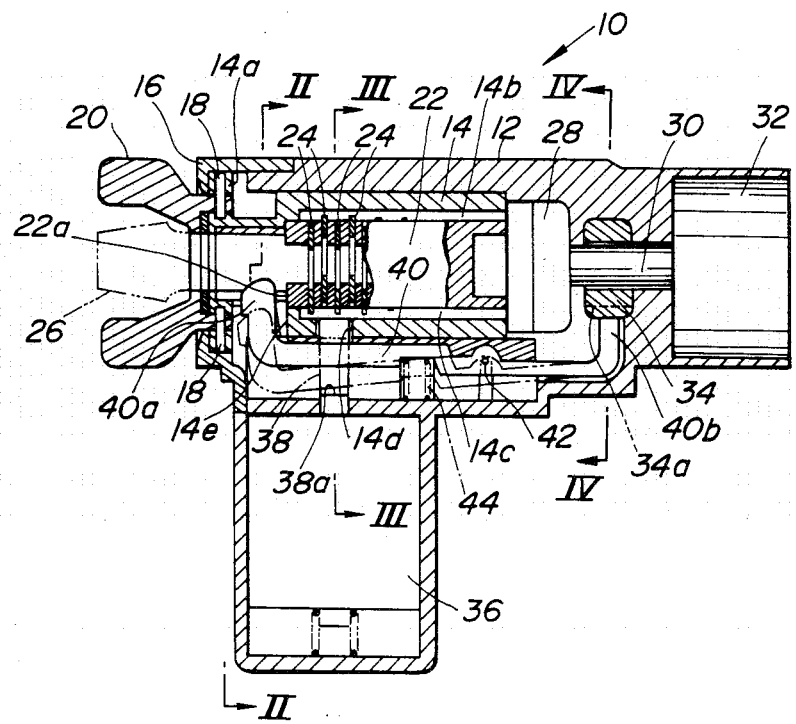
FIG. 1 is an axially sectional view of a steering lock device, according to the present invention.

Throughout the description, the terms "right", "left", "rightward", "leftward", "upward" and "downward" are to be understood as referring to the positions and directions defined with respect to FIG. 1.

Referring to the attached drawings, particularly FIGS. 1 to 5, there is shown a steering lock device 10 according to the present invention.

The device 10 comprises a hollow body 12 in which a cylindrical case 14 is received in a manner to be rotatable about the axis thereof. As is seen from FIG. 1, the cylindrical case 14 has an enlarged left end 14a which slidably abuts on a back surface of an apertured cap 16 secured to the body 12.

Secured to the enlarged left end 14a of the case 14 by locking pins 18 is a knob 20 which is projected outward from the cap 16. Thus, the knob 20 and the cylindrical case 14 rotate together as a unit. A rotor 22 is received in the cylindrical case 14 in a manner to be rotatable about the axis thereof relative to the case 14. Designated by numerals 24 are a series of tumblers which are carried by the rotor 22 with their one ends projected into grooves 14b and 14c formed in the cylindrical case 14. Upon insertion of a key 26 into the rotor 22, the tumblers 24 are drawn into the rotor 22 thereby cancelling a locked condition of the rotor 22 relative to the cylindrical case 14. Thus, under this condition, the rotor 22 can be rotated about its axis in response to turning of the key 26.

Secured to the right end of the rotor 22 is a cam 28 from which an operating rod 30 extends toward an ignition switch 32 for operating the same. As is seen from FIGS. 5 and 4, the cam 28 carries thereon a hanger member 31 which holds a locking bar 34. Although not shown in the drawings, the leading end of the locking bar 34 is projectable into a lock hole formed in an associated steering shaft for locking the same. Designated by numeral 33 is a spring which biases the hanger member 31 and thus the locking bar 33 in the steering shaft locking direction. For the reason which will be clarified hereinafter, the locking bar 34 is formed with a groove 34a. It is thus to be noted that upon turning of the key 26 to a given position, for example, START position, the operating rod 30 turns the ignition switch 32 ON and at the same time, the cam 28 lifts the locking bar 34 up for unlocking the steering shaft.

Referring back to FIG. 1, at one side of the hollow body 12, there is mounted an electromagnetically operated actuator 36 which has a locking plunger 38 which is projectable into a locking hole 14d formed in the cylindrical case 14. Thus, when the locking plunger 38 is projected into the hole 14d, the cylindrical case 14 becomes locked relative to the hollow body 12.

A so-called "back-up" means is further provided in the present invention, which functions to assurely hold the locking bar 34 in the steering shaft unlocking condition when the key 26 in the rotor 22 assumes ON or START position. The back-up means comprises a check lever 40 arranged beside the cylindrical case 14. The check lever 40 is pivotally supported at its generally middle portion by a pin 42 which thus serves as a fulcrum of the check lever 40. The pin 42 is constructed of a resilient material so that upon application of external force thereto, it is moved downward in FIG. 1 against the biasing force created therein. A left bent end portion 40a of the check lever 40 is projectable into the rotor 22 through mated apertures 14e and 22a which are formed in the cylindrical case 14 and the rotor 22 respectively. A right bent end portion 40b of the check lever 40 is engageable with the afore-mentioned groove 34a of the locking bar 34. A coil spring 44 is arranged to bias the check lever 40 in a clockwise direction in FIG. 1, that is, in a direction to project the left bent end portion 40a of the lever 40 into the rotor 22, as is illustrated by a solid line in the drawing.

As is seen from FIGS. 1 and 3, the locking plunger 38 of the actuator 36 has a recess 38a into which a left portion of the check lever 40 is received with its one side contacting with one side wall 38b of the recess 38a.

As is seen from FIG. 2, the cylindrical case 14 is formed near the aperture 14e with an outward projection 14f which suppresses extreme turning of the case 14, as will be understood hereinafter.

Referring to FIG. 6, there is shown a control system for controlling the electromagnetically operated actuator 36, which generally comprises a keyboard 46 mounted, for example, on an instrument panel of a driver's cabin, a control unit 48 and a vehicle condition sensor 50. The keyboard 46 has a plurality of keys numbered as S, 1, 2, 3 ... 0, as shown. When, under standstill of the vehicle, a predetermined code number is inputted by pushing the keys of the keyboard 46, the control unit 48 energizes the actuator 36 causing the locking plunger 38 to be drawn into the actuator 36.

In the following, operation of the steering lock device 10 will be described with reference to the drawings.

Figure 2:
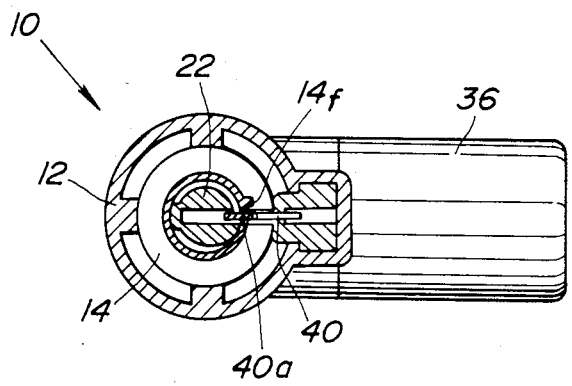
FIG. 2 is a sectional view taken along the line II—II of FIG. 1.
Figure 4:
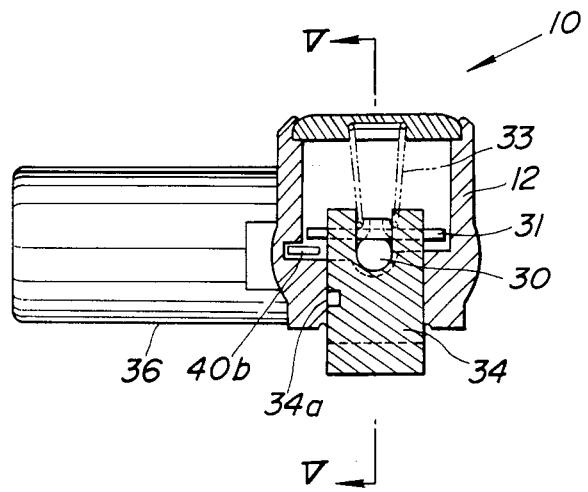
FIG. 4 is a sectional view taken along the line IV—IV of FIG. 1.
Figure 5:
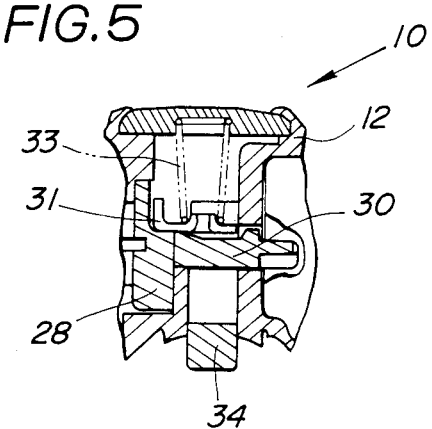
FIG. 5 is a sectional view taken along the line V—V of FIG. 4.

For ease of explanation, it will be commenced with respect to a condition wherein, as is shown in FIGS. 1, 2 and 3, the locking plunger 38 of the actuator 36 is projected into the locking hole 14d of the cylindrical case 14 thereby to lock the case 14 relative to the body 12.

When the key 26 is inserted into the rotor 22, the tumblers 24 are all drawn back into the rotor 22 cancelling the locked connection between the rotor 22 and the locked cylindrical case 14 and at the same time, the left bent end portion 40a of the check lever 40 is pushed back from the rotor 22 moving the pin 42 downward against the biasing force applied thereto. Thus, thereafter, the rotor 22 can be rotated in response to turning of the key 26. When the key 26 is turned to a given position, for example, ON or START position, the ignition switch 32 is turned ON and at the same time, the locking bar 34 is lifted up by the cam 28 against the force of the spring 33 (see FIG. 4) thereby unlocking the steering shaft. Upon completion of this lifting of the locking bar 34, the right bent end portion 40b of the check lever 40 is brought into locking engagement with the groove 34a of the locking bar 34 thereby assurely holding the same in the steering shaft unlocking position.

When, for stopping the engine, the key 26 is turned in a reversed direction to OFF position and finally to LOCK position, the ignition switch 32 is turned OFF. At the same time, the cam 28 is turned. However, due to the locking engagement kept between the check lever 40 and the locking bar 34, the locking bar 34 is unmoved keeping disengagement from the lock hole of the steering shaft. When now the key 26 is removed from the rotor 22, the left bent end portion 40a of the check lever 40 is permitted to project into the rotor 22 by the force of the spring 44, inducing a clockwise pivotal movement of the check lever 40 about the pin 42. Thus, the right bent end portion 40b of the lever 40 is disengaged from the groove 34a of the locking bar 34 permitting the bar 34 to thrust into the locking hole of the steering shaft under operation of the spring 33. Thus, under this condition, the steering shaft is locked and the tumblers 24 are projected into the grooves 14b and 14c of the cylindrical case 14.

When, now, for unlocking the steering shaft without using the key 26, a code number is inputted by manipulating the keyboard 46, the actuator 36 is energized thereby disengaging the locking plunger 38 from the locking hole 14d of the cylindrical case 14. During this movement of the locking plunger 38, the side wall 38b (see FIG. 3) of the groove 38a of the plunger 38 pushes the check lever 40 to pivot the same in a counterclockwise direction in FIG. 1 against the biasing force of the coil spring 44. With this operation, the left bent end portion 40a is disengaged from the rotor 22 and at the same time, the right bent end portion 40b is pressed against the locking bar 34. When then the knob 20 is turned in a certain direction, the cylindrical case 14 is rotated together therewith due to their united construction. Because the tumblers 24 are projected into the grooves 14b and 14c of the cylindrical case 14, the rotation of the case 14 rotates the rotor 22 in the same direction. With this, the outward projection 14f (see FIG. 2) of the cylindrical case 14 passes by the left bent end portion 40a of the check lever 40 and comes to a diametrically opposed position of the case 14. When the rotor 22 comes to a position corresponding to ACC position of the key 26, a suitable signal is applied to the control unit 48 to stop energization of the actuator 36. Thus, upon this, the locking plunger 38 is projected. However, under this condition, the cylindrical case 14 assumes a position with the locking hole 14d thereof positioned away from the locking plunger 38. That is, under this condition, the leading end of the plunger 38 abuts slidably on the cylindrical outer surface of the cylindrical case 14. Thus, thereafter, the turning of the knob 20 toward START position is permitted without energization of the actuator 36.

During the turning of the rotor 22 toward START position, the locking bar 34 is lifted up disengaging from the locking hole of the steering shaft due to turning of the cam 28. Similar to the aforementioned case, upon the locking bar 34 lifted up to a certain position, the right bent end portion 40b of the check lever 40 is brought into locking engagement with the groove 34a of the locking bar 34 thereby holding the bar 34 in the steering shaft unlocking position. Thus, under this condition, the steering shaft is freely rotatable.

When, for the purpose of locking the steering shaft again, the knob 20 is turned back toward LOCK position, the outward projection 14f (see FIG. 2) of the cylindrical case 14 is brought into abutment with the left bent end portion 40a of the check lever 40 thereby preventing further turning of the case 14 in the same direction. Upon this, one selected key of the keyboard 46 is pushed in order to energize the actuator 36 in a case wherein the vehicle is at a standstill. Thus, the left bent end portion 40a of the check lever 40 is separated away from the outward projection 14f due to the retracted movement of the locking plunger 38, so that thereafter the rotor 22, the cylindrical case 14 and thus the knob 20 are permitted to turn to LOCK position. When the knob 20 is turned to LOCK position, a known sensor mounted in the ignition switch 32 issues a signal to the control unit 48 to stop energization of the actuator 36. Thus, the locking plunger 38 is thrusted into the locking hole 14d of the cylindrical case 14 and at the same time, the left bent end portion 40a of the check lever 40 is projected into the rotor 22 through the mated apertures 14e and 22a, as will be understood from FIG. 1. Simultaneously, the right bent end portion 40b of the check lever 40 is disengaged from the groove 34a of the locking bar 34 thereby permitting the latter to thrust into the locking hole of the steering shaft to lock the same.

What is claimed is:

1. A steering lock device having a locking bar which is lockably engageable with a steering shaft, comprising:
    a hollow body;
    a cylindrical case rotatably received in said hollow body and having a locking hole;
    a knob connected to said cylindrical case to rotate therewith;
    a rotor rotatably received in said cylindrical case and having a plurality of tumblers which are projectable therefrom into grooves formed in said cylindrical case;
    a check lever pivotally mounted in said hollow body, said check lever having one end projectable into said rotor and the other end engageable with a given portion of said locking bar to hold the same in a steering shaft unlocking condition;
    biasing means for biasing said check lever in a direction to project said one end into said rotor;
    an actuator having a locking plunger which is projectable into said locking hole of said cylindrical case to lock the same relative to said hollow body; and
    coupling means for coupling said check lever and said locking plunger in a manner to move said one end of said check lever away from said rotor when said locking plunger is moved away from said locking hole of the cylindrical case.

2. A steering lock device as claimed in claim 1, in which said given portion of said locking bar forms a groove and said biasing means includes means for projecting the other end of said check lever into the groove in the locking bar.

3. A steering lock device as claimed in claim 1, further comprising:
    a cam connected to said rotor to rotate therewith;
    an operating rod extending from said cam toward an ignition switch to operate the same;
    a hanger member carried by said cam, said hanger member carrying said locking bar; and
    biasing means for biasing said hanger member and said locking bar in a direction to establish the locking connection between said locking bar and said steering shaft.

4. A steering lock device as claimed in claim 1, in which said coupling means comprises:
    a portion of said locking plunger, said portion being formed with a groove having opposed side walls; and
    a portion of said check lever which is slidably received in said groove with its one side contacting with one of said opposed side walls of the groove of said locking plunger.

5. A steering lock device as claimed in claim 4, in which said actuator is of an electromagnetically operated type wherein upon energization, said locking plunger is drawn into said actuator.

6. A steering lock device as claimed in claim 5, in which said check lever is pivotally supported on a fulcrum pin which is flexed when an external force is applied thereto.

7. A steering lock device as claimed in claim 6, in which said fulcrum pin is constructed of a resilient material.

8. A steering lock device as claimed in claim 7, in which said biasing means is a coil spring.

9. A steering lock device as claimed in claim 8, in which said cylindrical case and said rotor are respectively formed with mated apertures through which said one end of said check lever is projectable into said rotor.

* * * * *